(12) United States Patent
Blumenstein et al.

(10) Patent No.: US 7,114,784 B1
(45) Date of Patent: Oct. 3, 2006

(54) DUMPING INSERT FOR TRUCK

(76) Inventors: Richard C. Blumenstein, 1648 Taylor Rd. #514, Port Orange, FL (US) 32128-6753; Steven J. Cook, 2138 Andrews St., Fort Collins, CO (US) 80528

( * ) Notice: Subject to any disclaimer, the term of this patent is extended or adjusted under 35 U.S.C. 154(b) by 70 days.

(21) Appl. No.: 10/947,771

(22) Filed: Sep. 23, 2004

(51) Int. Cl.
*B60P 1/16* (2006.01)

(52) U.S. Cl. .................... 298/1 A; 298/21 V; 298/19 V

(58) Field of Classification Search ................. 298/1 A, 298/21 V, 19 V; 414/506; 296/183.2
See application file for complete search history.

(56) References Cited

U.S. PATENT DOCUMENTS

| | | | |
|---|---|---|---|
| 1,336,163 A | 4/1920 | Settlage | |
| 1,942,319 A | 1/1934 | Wright | |
| 2,033,209 A | 3/1936 | Teetor | |
| 3,411,825 A | 11/1968 | Fulton | |
| 3,471,045 A | 10/1969 | Panciocco | |
| 3,740,097 A | 6/1973 | Parker et al. | |
| 3,833,261 A * | 9/1974 | Dingler | ....................... 298/1 A |
| 4,126,357 A | 11/1978 | Day | |
| 4,236,854 A | 12/1980 | Rogers | |
| 4,418,959 A | 12/1983 | Dunlap | |
| 4,834,599 A | 5/1989 | Gordon et al. | |
| 5,447,361 A | 9/1995 | Phillips | |
| 6,196,634 B1 * | 3/2001 | Jurinek | ....................... 298/1 A |

* cited by examiner

*Primary Examiner*—Stephen Gordon
(74) *Attorney, Agent, or Firm*—Paul S. Rooy P.A.

(57) ABSTRACT

A dumping insert for use with a truck. The dumping insert features a dumping body rotatably attached to a base. The base includes a pair of tracks mutually attached at one end by a forward brace and at the other by a rear brace. Springs urge the dumping body into retraction, and track outer wall slots in which traveler pins reciprocate prevent dumping body over-extension. A pulley arrangement is disclosed which increases dumping capacity, and a skirt is hingeadly attached to a rear of the dumping body which helps prevent access to the winch and cable area. Quick-install/removal features include forward brace arms attached at opposite ends of the forward brace, a dumping body downlock strap, low-friction glides attached to the tracks, and an upper hitch assembly attached to the base, a lower hitch assembly adjustably attached to the upper hitch assembly, and a receptacle for attachment to a truck.

28 Claims, 8 Drawing Sheets

DUMPING INSERT FOR TRUCK

BACKGROUND OF THE INVENTION

1. Field of the Invention

This invention relates to dumping mechanisms, and in particular to a dumping insert for truck.

2. Background of the Invention

Large dedicated dump trucks for transport and dumping of materials are old and well-known in the art. These are generally large, complex, and expensive.

Thus, it would be desirable to provide a smaller, less expensive alternative to the traditional dump truck for jobs which do not require the capacity and expense of using a dedicated traditional dump truck.

One solution has been the retrofit of existent pickup trucks with dumping inserts. While these provide a less expensive dumping solution, they also have presented a number of problems. Most of these designs require drilling of dumping insert mounting holes through the truck bed, thus rendering installation of the dumping insert laborious and time-consuming. In addition, if the holes are not properly protected from the elements (such as rain water, melting snow, etc.), then these drilled mounting holes may become a source of corrosion.

Existing Designs

For instance, U.S. Pat. No. 4,126,357 was granted Day for a flat-bottomed dumping container pivotally affixed to a T-shaped bracing structure, which in turn was attached to a truck bed with bolts. A hydraulic ram was pivotally connected between the bracing structure and the underside of the dumping container, which upon extension inclined the dumping container to empty its contents. However, holes had to be drilled into the truck bed to receive the bolts of the bracing structure, leaving visible holes when the bracing structure was detached from the truck bed. Furthermore, it was difficult to work to align, tighten, and loosen the bolts.

Panciocco was granted U.S. Pat. No. 3,471,045 for a flat-bottomed dumping container that slid on channels welded or bolted to the upright sides of a truck bed. To dump its contents, the container was rolled rearwardly and pivoted. After dumping, the container was returned to its initial position. Wright was granted U.S. Pat. No. 1,942,319 for a flat-bottomed dumping container that was pivotally attached to a pair of beams that were in turn attached to a supporting frame on a truck bed. One end of each arm was connected to rollers located on the beams, and the other end of each arm was attached to the flat-bottomed dumping container. A rotatable drum was connected by cable to the rollers. Rotating the drum pulled the rollers along the pair of beams to incline the dumping container about its pivot point to empty its contents. Panciocco's teaching of welding or bolting the channels to the walls of the truck bed, and Wright's teaching of mounting the dumping container to a supporting frame both resulted in dumping containers that were not readily detachable from a truck. In addition, the drilled mounting holes caused the same problems as mentioned previously in connection with the Day '357 patent.

U.S. Pat. No. 5,447,361 was granted Phillips for a portable dumping insert for a pickup truck. While the Phillips '361 patent overcame many of the problems associated with the prior art dumping inserts by avoiding the necessity of drilling holes in the truck bed, the installation and removal of the dumping insert still took longer than necessary. Accordingly, the improvements over the Phillips '361 patent taught in the instant patent application are intended to render the installation and removal of the instant dumping insert even faster than that made possible by use of the Phillips '361 invention. In addition, certain other features are disclosed in the instant application which contribute towards improving the performance and utility of the Phillips '361 design.

Thus, it would be desirable to provide an easily attachable and detachable dumping insert which may be widely used with lighter duty trucks such as pickup trucks without modifications to the truck bed, and that is of a sufficiently universal design to permit its use on a wide variety of different trucks. In addition, it would be desirable to provide a dumping insert which is more quickly and easily installed and removed from conventional truck beds than has been disclosed to date within the art.

SUMMARY OF THE INVETION

Accordingly, it is an object of the present invention to provide a dumping insert for truck which is quickly and easily attached and detached from a truck bed. Design features allowing this object to be accomplished include a forward brace having adjustable forward brace arms with forward brace arm extensible pins, an upper hitch assembly having upper hitch assembly fastener apertures with different diameter lobes, a lower hitch assembly with a lower hitch assembly extensible pin, a receptacle mountable to the truck bumper having a receptacle bore sized to admit the lower hitch assembly extensible pin, a downlock strap adjustably mountable to the forward brace having a mounting strap hook sized to engage with a dumping body, and glides attached to lower track surfaces. Advantages associated with the accomplishment of this object include ease of use, time savings, and enhanced flexibility of use.

It is another object of the present invention to provide a dumping insert for truck which retracts readily into a retracted position. Design features allowing this object to be accomplished include a base having tracks, a forward brace, and a traveler, and at least one spring attached at one end to the forward brace and at an opposite end to the traveler. Benefits associated with the accomplishment of this object include faster and smoother operation, and the associated time savings.

It is still another object of this invention to provide a dumping insert for truck which will not over-extend during a dumping operation. Design features enabling the accomplishment of this object include a base having tracks with track outer walls, a longitudinal track outer wall slot in each track outer wall, a traveler having a traveler pin at each end sized to fit into a respective outer wall slot. Advantages associated with the realization of this object include avoidance of uncontrolled dumping body over-extension, time savings, and enhanced safety.

It is another object of the present invention to provide an alternate embodiment dumping insert for truck capable of dumping increased weights. Design features allowing this object to be accomplished include a base having a rear brace and a traveler, a winch and a pulley mounted to the rear brace, a pair of pulleys mounted to the traveler, and a cable attached to the winch, routed through a first traveler pulley, the rear brace pulley, a second traveler pulley, and then attached to the rear brace. Benefits associated with the accomplishment of this object include increased dumping capacity, and consequently enhanced flexibility of use.

It is still another object of this invention to provide a dumping insert for truck which provides a cover for the winch, cable, and other associated equipment mounted to a rear brace. Design features enabling the accomplishment of this object include a skirt hingeadly attached to the rear of a dumping body which covers the winch, cable, and other associated equipment mounted to a rear brace when the dumping body is extended, retracted, and at any point in between. Advantages associated with the realization of this object include increased safety, and the opportunity to inscribe commercial messages on the skirt.

BRIEF DESCRIPTION OF THE DRAWINGS

The invention, together with the other objects, features, aspects and advantages thereof will be more clearly understood from the following in conjunction with the accompanying drawings.

Eight sheets of drawings are provided. Sheet one contains FIG. 1. Sheet two contains FIG. 2. Sheet three contains FIG. 3. Sheet four contains FIGS. 4 and 5. Sheet five contains FIGS. 6 and 7. Sheet six contains FIGS. 8 and 9. Sheet seven contains FIG. 10. Sheet eight contains FIGS. 11 and 12.

DETAILED DESCRIPTION OF THE PREFERRED EMBODIMENT

Figure 1:
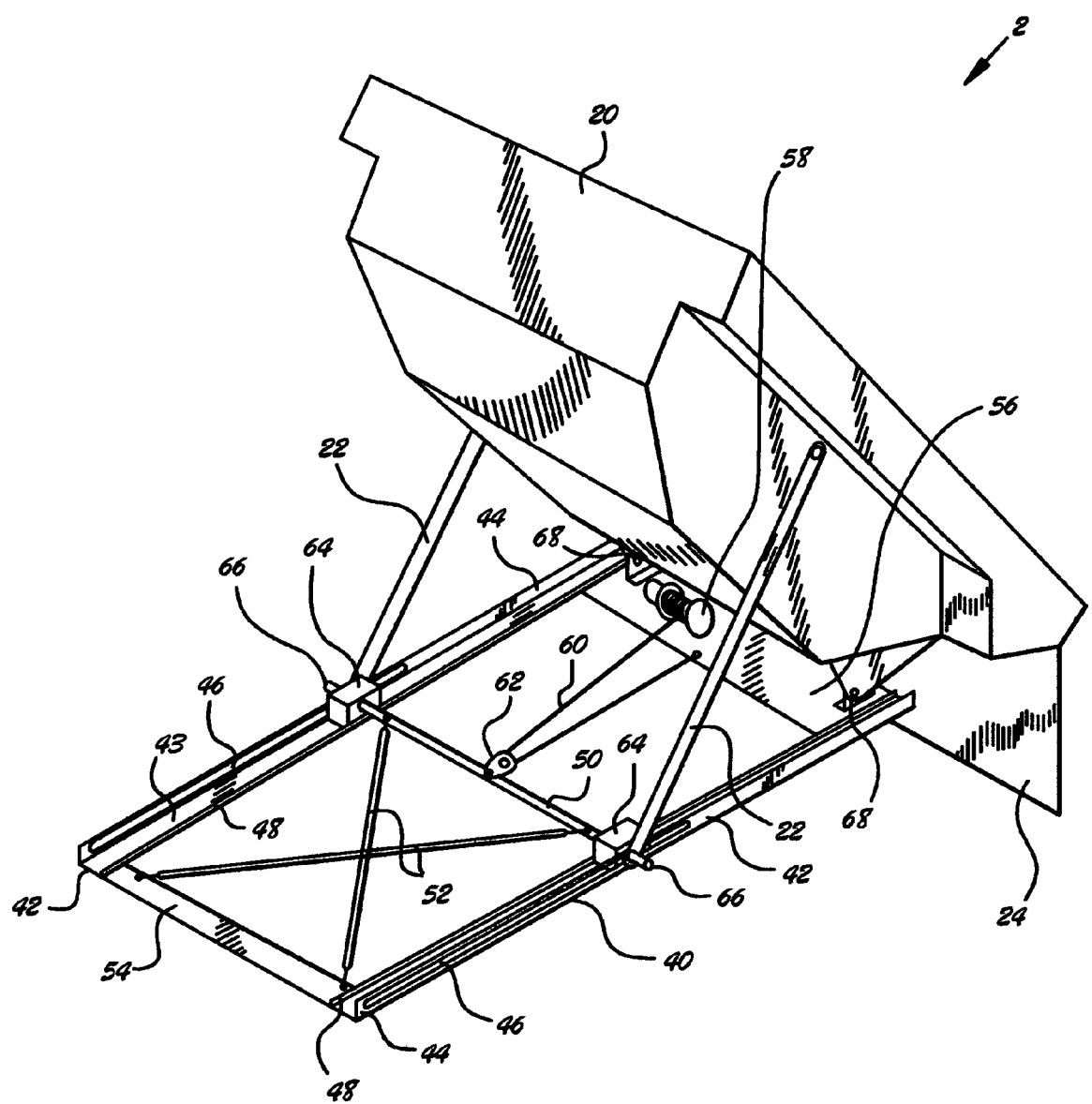
FIG. 1 is a front quarter isometric view of a dumping insert in the fully extended position.

Referring now to FIG. 1 we observe a front quarter isometric view of dumping insert 2 in the fully extended, or dumping, position. Dumping insert 2 comprises dumping body 20 rotatably attached to base 40 at hinges 68. Base 40 comprises a pair of parallel tracks 42 joined at one end by forward brace 54, and at an opposite end by rear brace 56.

Traveler 50 is free to reciprocate along the length of tracks 42. A pair of dumping body arms 22 connect opposite ends of traveler 50 with opposite sides of dumping body 20. Each dumping body arm 22 is rotatably attached at one end to a side of dumping body 20, and at an opposite end is rotatably attached to an end of traveler 50. Thus, as traveler 50 reciprocates along tracks 42, dumping body arms 22 cause dumping body 20 to extend and retract relative to base 40.

Dumping body 20 is urged into a retracted position by spring(s) 52, which may be elastic cords, bungee cords, coil springs, or any other appropriate resilient linear member. Although in the preferred embodiment traveler 50 was spring loaded towards forward base 54 by at least one spring 52, which was attached at one end to forward brace 54 and at an opposite end to traveler 50, it is contemplated to be within the scope of this disclosure that spring(s) 52 may be located in any appropriate position which would urge dumping body 20 into a retracted position, e.g. attached at one end to dumping body 20 and at an opposite end to forward brace 54 or track 42, etc.

Traveler 50 may be moved towards rear brace 56 by cable 60 attached to winch 58, routed through pulley 62 attached to traveler 50, and attached to rear brace 56. Cable 60 may be metal cable, rope, or any other appropriate elongate rope-like element. In the preferred embodiment, winch 58 was an electric winch, although it is intended to fall within the scope of this disclosure that any appropriate winch be employed.

Each track 42 comprises a track outer wall 44 and a track inner wall 48 rigidly attached at opposite sides of track floor 43. Each track outer wall 44 comprises a track outer wall slot 46. A traveler pin 66 sized to slidably fit into track outer wall slot 46 is disposed at either end of traveler 50. Traveler pins 66 reciprocating within track outer wall slots 46 prevent dumping body 20 from over-extending in the presence of gusty winds or where an operator inadvertently attempts to drive a truck to which dumping insert 2 is mounted, while dumping insert 2 is partially or fully extended. Any operation or driving of a truck to which dumping insert 2 is mounted, while dumping insert 2 is partially or fully extended is prohibited by the operation manual, for safety reasons.

Slider blocks 64 are sized to slide over track floor 43 between track inner wall 48 and track outer wall 44. A slider block 64 is rotatably attached to each end of traveler 50. Slider blocks 64 are manufactured of low friction material such as ultra high molecular weight plastic, Teflon® low friction material, other synthetic, or any other appropriate low-friction material. Thus, track floors 43 provide a bearing surface for slider blocks 64 as dumping body extends and retracts, and slider block 64 sideways travel is constrained by track inner walls 48 and track outer walls 44—track inner walls 48 and track outer walls 44 literally keep slider blocks 64 "on-track".

Figure 2:
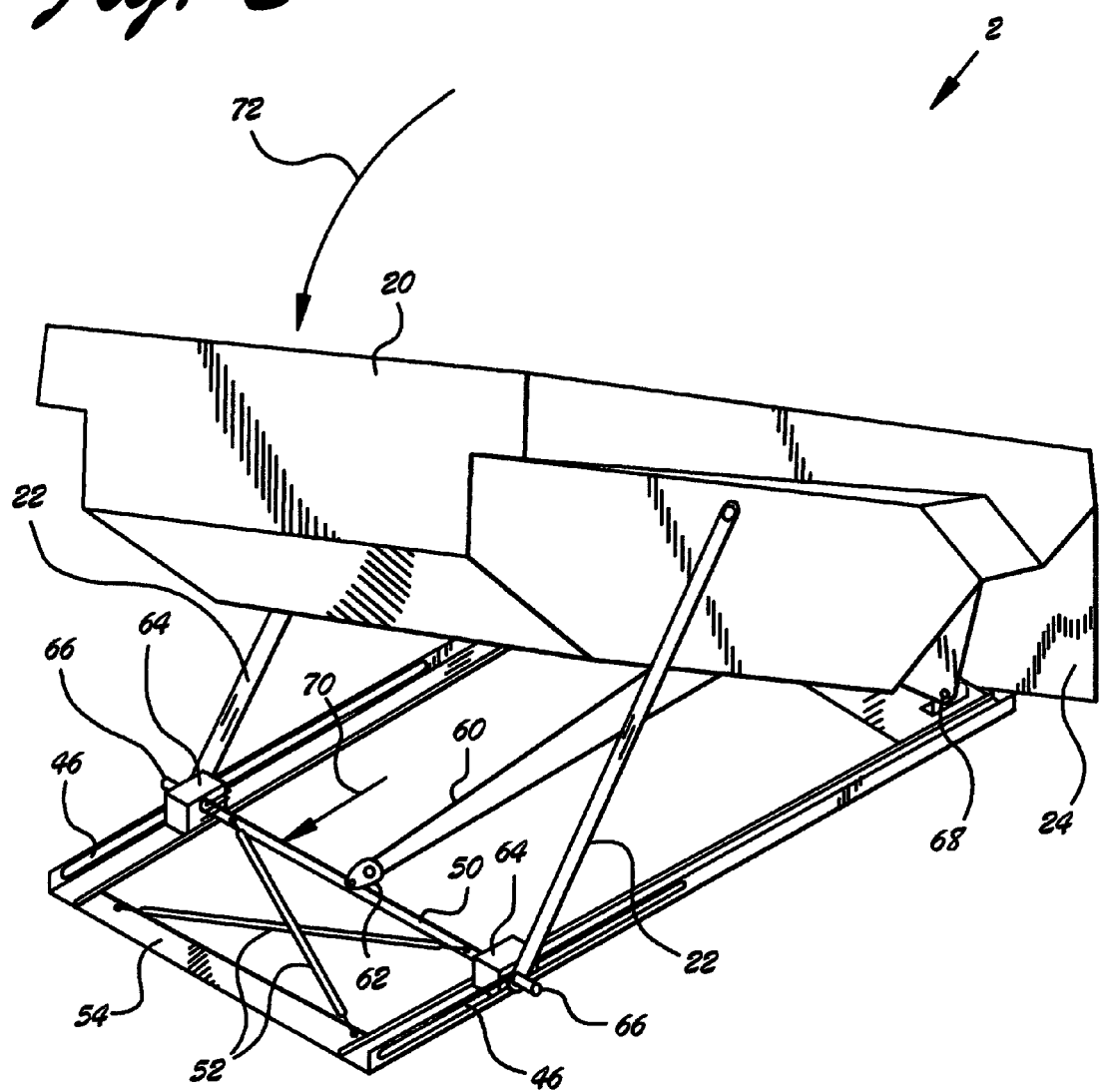
FIG. 2 is a front quarter isometric view of a dumping insert in mid-travel towards the retracted position.

FIG. 2 is a front quarter isometric view of dumping body 2 in mid-travel towards the retracted position. Winch 58 is operated so as to release cable 60. Springs 52 pull traveler 50 towards forward brace 54, as indicated by arrow 70 in FIG. 2. In turn, dumping body arms 22 pull dumping body 20 into the retracted position as indicated by arrow 72. The low-friction nature of the material from which slider blocks 64 are manufactured permits slider blocks 64 to smoothly travel over track floors 43.

Thus, springs 52 aid gravity in retracting dumping body 20 about hinges 68, as indicated by arrow 72 in FIG. 2. Springs 52 provide an important aid in retracting dumping body 20, especially at the beginning of the retraction cycle.

Figure 3:
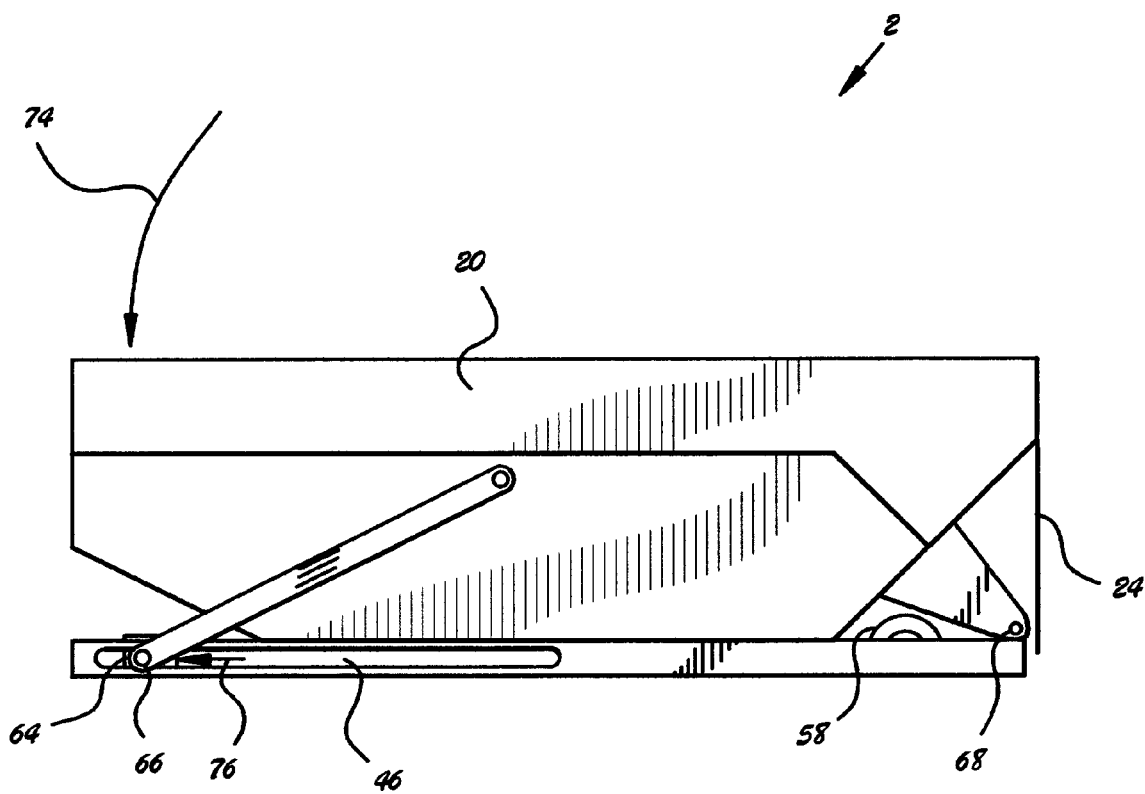
FIG. 3 is a side view of a dumping insert in the fully retracted position.

FIG. 3 is a side view of dumping body 20 in the fully retracted position. Gravity has urged dumping body 20 into the fully retracted position as indicated by arrow 74. Springs 52 have urged traveler blocks 64 into the fully retracted position as indicated by arrow 76.

Dumping body 20 is extended into the dumping position by reversing the above steps. FIG. 3 depicts dumping body 20 in the fully retracted position. To extend dumping body 20, winch 58 is activated to reel in cable 60. The action of reeling in cable 60 urges traveler 50 towards rear brace 56. In turn, dumping body arms 22 cause dumping body 20 to extend around hinges 68, in opposite direction of arrows 74 and 72 in FIGS. 3 and 2 respectively. Actuation of winch 58 is ceased when dumping body 20 is in the fully extended position depicted in FIG. 1.

As may be observed in FIGS. 1–3, skirt 24 is hingeably mounted to the rear of dumping body 20. Throughout the retraction/extension cycle of dumping body 20, skirt 24 helps avoid individuals from introducing their hands or other body parts into the winch 58 area. Thus, skirt 24 acts as a safety device to help prevent injury by limiting access to the winch 58 area.

Figure 4:
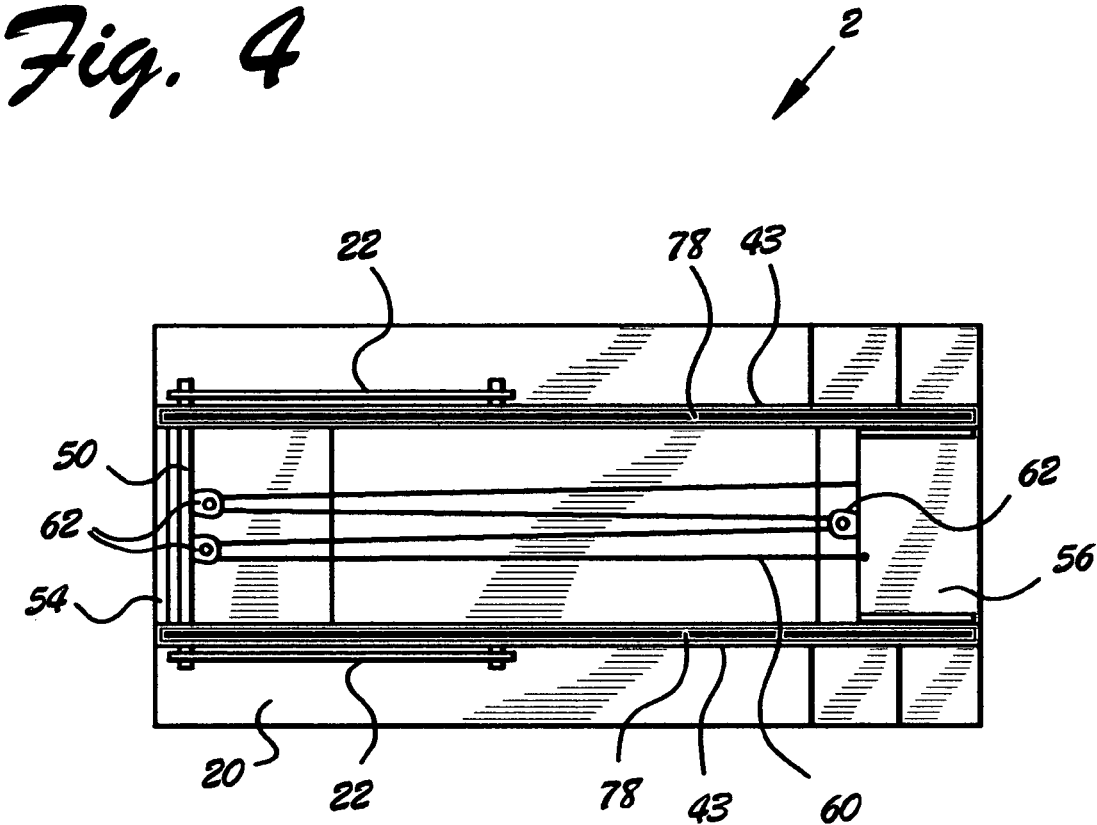
FIG. 4 is a bottom view of an alternate embodiment dumping insert in the fully retracted position.

FIG. 4 is a bottom view of an alternate embodiment dumping body 20 in the fully retracted position. Winch 58 (view blocked by rear brace 56) and a pulley 62 are mounted to rear brace 56. Two pulleys 62 are mounted to traveler 50. Cable 60 is attached to winch 58, then routed through a first pulley 62 attached to traveler 50, then through the pulley 62 attached to rear brace 56, then through a second pulley 62 attached to traveler 50, and then attached to rear brace 56. This configuration provides increased dumping capability for a given winch 58 size.

FIG. 4 also illustrates glides 78 attached to a lower surface of track floors 43. Glides 78 are manufactured of low friction material such as ultra high molecular weight ("UHMW") plastic, Teflon, other synthetic, or any other appropriate low-friction material. Glides 78 aid in sliding dumping insert 2 over a truck bed during attachment and detachment of dumping insert 2 from a truck. Thus, glides 78 reduce the effort and time required to attach and detach dumping insert 2 from a truck.

Figure 5:
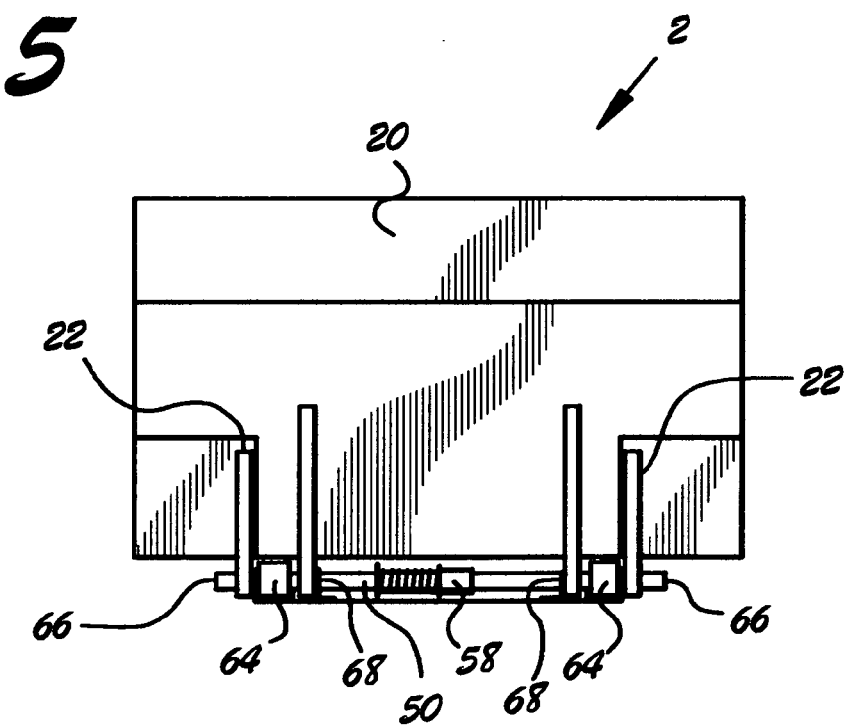
FIG. 5 is a rear view of a dumping insert in the fully retracted position.

FIG. 5 is a rear view of dumping insert 2 in the fully retracted position, with skirt 24 removed. Skirt 24, if installed, would limit individuals access to the winch 58 and cable 60 area, thus providing an important safety feature.

Figure 6:
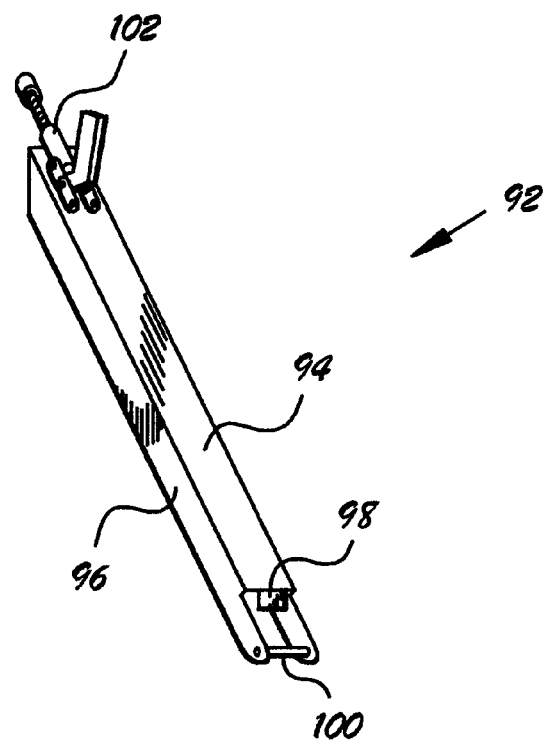
FIG. 6 is a front quarter isometric view of a forward brace arm.

FIGS. 6–9 are detail drawings of a forward brace 54 incorporating forward brace arms 92. FIG. 6 is a front quarter isometric view of forward brace arm 92. Forward brace arm 92 comprises a forward brace arm wall 96 rigidly attached along either side of forward brace arm roof 94.

Forward brace arm 92 incorporates forward brace arm tab 98 and forward brace arm pin 100 at one end, and forward brace arm extensible pin 102 at an opposite end. In the preferred embodiment, forward brace arm extensible pin 102 was a commercially available over-the-center toggle extensible pin.

Forward brace arm pin 100 extends between the two forward brace arm walls 96. Forward brace arm tab 98 is attached at the end of forward brace arm roof 94 opposite forward brace arm extensible pin 102. Forward brace 54 is sized to nest within forward brace arm 92.

Figure 7:
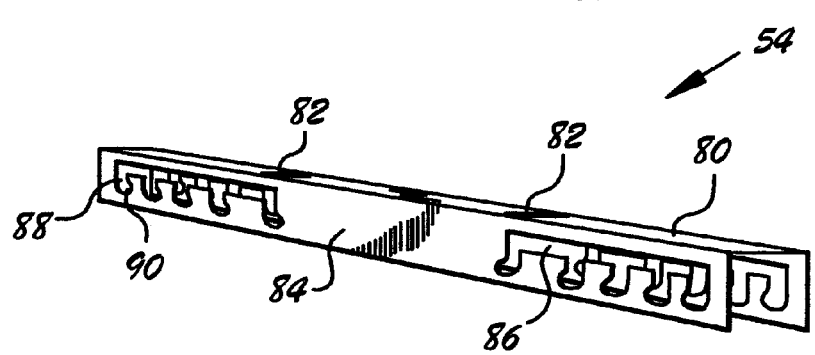
FIG. 7 is a front quarter isometric view of a forward brace.

FIG. 7 is a front quarter isometric view of forward brace 54. Forward brace 54 comprises a forward brace arm wall 84 rigidly attached along either side of forward brace roof 80. Each forward brace arm wall 84 comprises a forward brace wall slot 86 disposed at each end. Each forward brace wall slot 86 comprises a plurality of forward brace wall slot lobes 88 extending from, and communicating with, the forward brace wall slot 86. Each brace wall slot lobe 88 terminates in a forward brace wall slot lobe détente 90. Each forward brace wall slot lobe détente 90 extends away from its associated forward brace wall slot lobe 88 towards the center of forward brace 54. Forward brace wall slot 86, forward brace wall slot lobes 88, and forward brace wall slot lobe détentes 90 are sized to admit a forward brace arm pin 100.

Associated with each centermost forward brace wall slot lobe détente 90 is a forward brace roof slot 82 disposed on forward brace roof 80 at a distance from the associated forward brace wall slot lobe détente 90 substantially equal to a distance between forward brace arm tab 98 and forward brace arm pin 100. This dimensional similarity permits forward brace arm tab 98 to fit within forward brace roof slot 82 while forward brace arm pin 100 is disposed within the forward brace wall slot lobe détente 90 associated with that forward brace roof slot 82, thereby holding the forward brace arm 92 in the stowed position depicted in FIG. 8.

Figure 8:
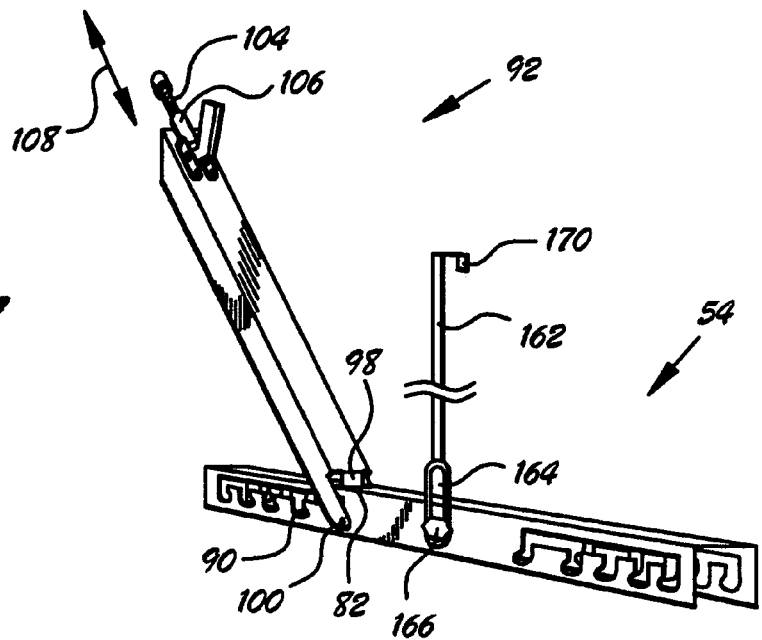
FIG. 8 is a front quarter isometric view of a forward brace with a forward brace arm attached in the stowed position.

FIG. 8 is a front quarter isometric view of a forward brace 54 with a forward brace arm 92 attached in the stowed position. This is accomplished by inserting forward brace arm pin 100 through opposing forward brace arm walls 96 and opposing forward brace wall slots 86 disposed between the opposing forward brace arm walls 96. Forward brace arm tab 98 is inserted into forward brace roof slot 82, and forward brace arm pin 100 is inserted into the opposing centermost forward brace wall slot lobe détentes 90 associated with the forward brace roof slot 82.

In the stowed position depicted in FIG. 8, forward brace arm 92 is held up at an approximately 30 degree angle relative to forward brace 54. This stowed position may be used when attaching and detaching dumping insert 2 from a truck bed, and prevents forward brace arms 92 from colliding with the truck bed wheel wells when sliding dumping insert 2 in and out of the truck bed.

FIG. 8 additionally depicts longitudinal adjustment which forward brace arm extensible pin 102 may incorporate. In the preferred embodiment, this was brought about by forward brace arm extensible pin threaded stud 104 and mating forward brace arm extensible pin threaded bore 106. Forward brace arm extensible pin threaded stud 104 may be rotated relative to forward brace arm extensible pin threaded bore 106 in order to make fine adjustments in the length of forward brace arm extensible pin 102, as indicated by arrow 108.

FIG. 8 also depicts downlock strap 162 adjustably attached to forward brace 54 by means of downlock strap fastener 166 through downlock strap slot 164 into forward brace threaded bore 168. Downlock strap hook 170 is disposed at an end of downlock strap 162 opposite downlock strap slot 164, and is sized to admit a forward top edge of dumping body 20. Although FIG. 8 depicts downlock strap 162 connecting forward brace 54 with a top front edge of dumping body 20, it is intended to fall within the scope of this disclosure that downlock strap 162 may be installed at any appropriate location so as to lock dumping body 20 in the retracted position, e.g. between a track 42 and a side of dumping body 20, etc.

Downlock strap 162 is installed by engaging downlock strap hook 170 with a forward top edge of dumping body 20, and tightening downlock strap fastener 166 through downlock strap slot 164 into forward brace threaded bore 168 in forward brace 54. Downlock strap 162 may be used to lock dumping insert 2 in the retracted position, for example when attaching and detaching dumping insert 2 from a truck.

Figure 9:
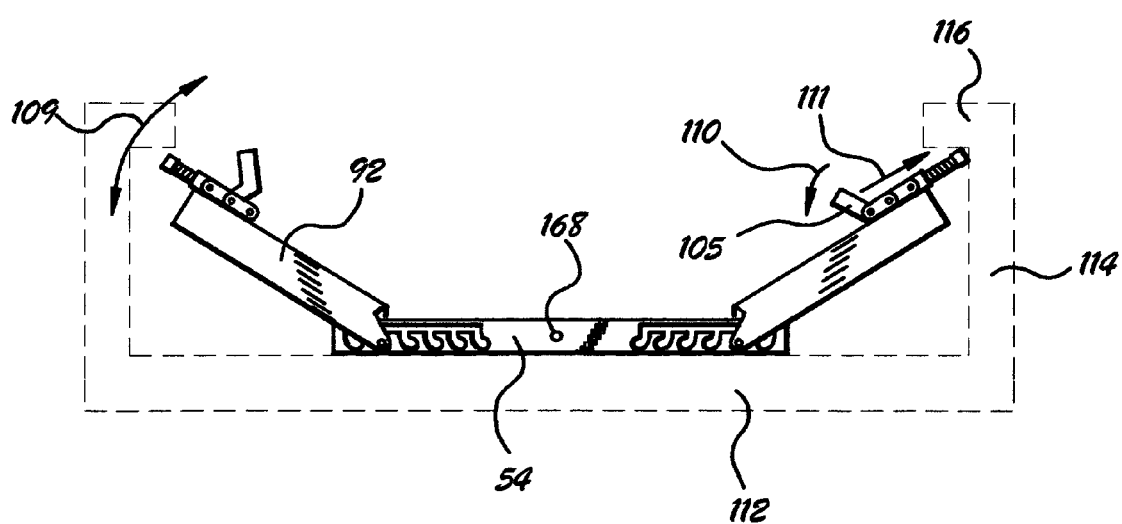
FIG. 9 is a front view of a forward brace with forward brace arms attached being installed in a truck bed.

FIG. 9 is a front view of a forward brace 54 with forward brace arms 92 attached being installed in a truck bed 112 shown in dashed lines. Forward brace arm 92 is free to rotate relative to forward brace 54 as indicated by arrow 109 in FIG. 9. Forward brace arm 54 is rotated until its forward brace arm extensible pin 102 points at the inside corner of the intersection of truck bed wall lip 116 and truck bed wall 114.

A course adjustment is made by inserting forward brace arm pin 100 into an appropriate pair of opposing forward brace wall slot lobe détentes 90. Then fine adjustment of the length of forward brace arm extensible pin 102 is effectuated by rotating forward brace arm extensible pin threaded stud 104 relative to forward brace arm extensible pin threaded bore 106, as described above. Finally, forward brace arm extensible pin handle 105 is moved as indicated by arrow 110 in FIG. 9 in order to extend forward brace arm extensible pin 102 as indicated by arrow 111 in FIG. 9. After both forward brace arm extensible pin 102 have been extended, forward brace 54 is securely held between opposing truck bed walls 114.

Figure 10:
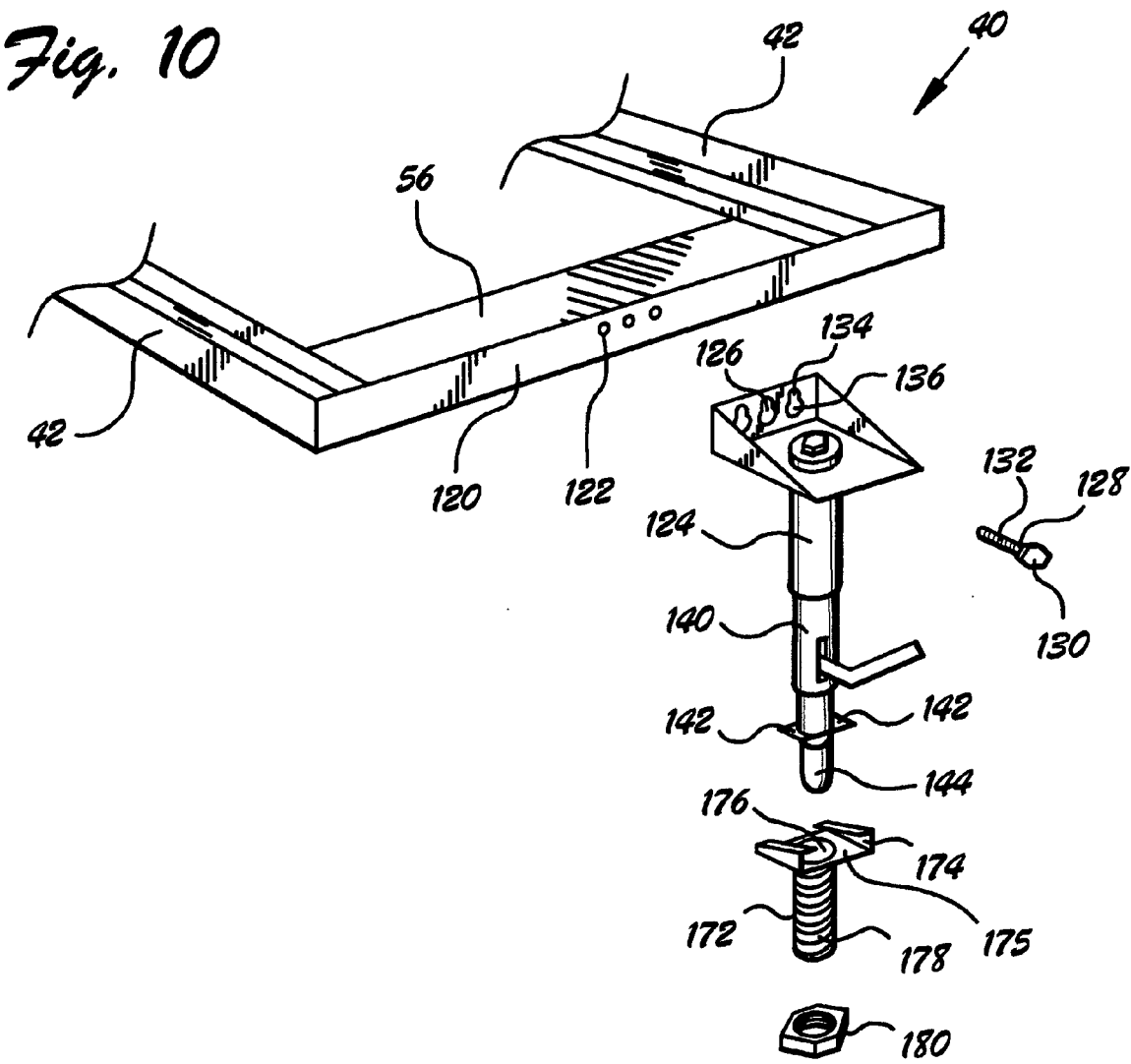
FIG. 10 is a rear quarter isometric view of a base, upper hitch assembly, lower hitch assembly, and mating receptacle.

FIG. 10 is a rear quarter isometric view of base 40, upper hitch assembly 124, lower hitch assembly 140, and mating receptacle 172. Rear brace 56 comprises rear brace wall 120 having at least one rear brace wall threaded bore 122.

Upper hitch assembly 124 comprises one upper hitch assembly fastener aperture 126 associated with each rear brace wall threaded bore 122. Upper hitch assembly 126 is fastened to rear brace wall 120 by means of upper hitch assembly fastener 128. Upper hitch assembly fastener 128 comprises upper hitch assembly fastener threaded stud 132 attached to upper hitch assembly fastener head 130.

Each upper hitch assembly fastener aperture 126 comprises an upper hitch assembly fastener aperture upper lobe 134 communicating with an upper hitch assembly fastener aperture lower lobe 136. Upper hitch assembly fastener aperture lower lobe 136 is sized to admit upper hitch assembly fastener head 130. Upper hitch assembly fastener aperture upper lobe 134 is sized to admit upper hitch assembly fastener threaded stud 132, but not upper hitch assembly fastener head 130. Due to these dimensional relationships, upper hitch assembly 124 may be quickly and easily disconnected from base 40 by merely loosening upper hitch assembly fastener(s) 128, sliding upper hitch assembly 124 upwards relative to base 40, and slipping upper hatch assembly fastener head(s) 130 through their respective upper hitch assembly fastener aperture lower lobe(s) 136.

Figure 11:
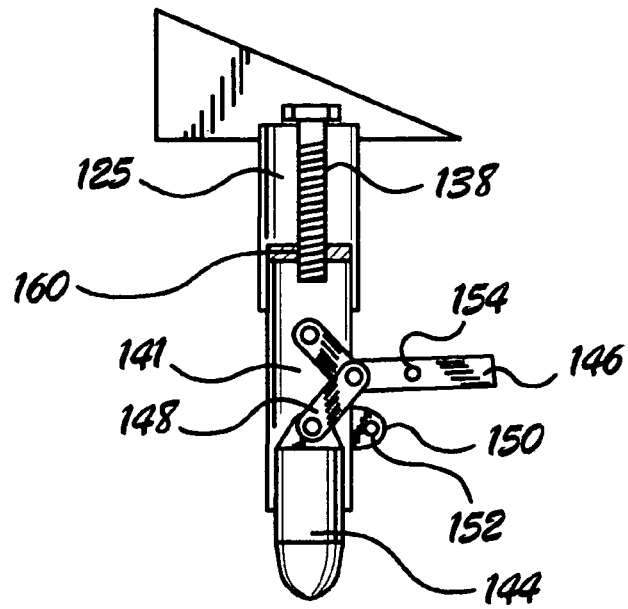
FIG. 11 is a side cross-sectional view of an upper hitch assembly mounted to a lower hitch assembly, with the lower hitch assembly extensible pin fully retracted.
Figure 12:
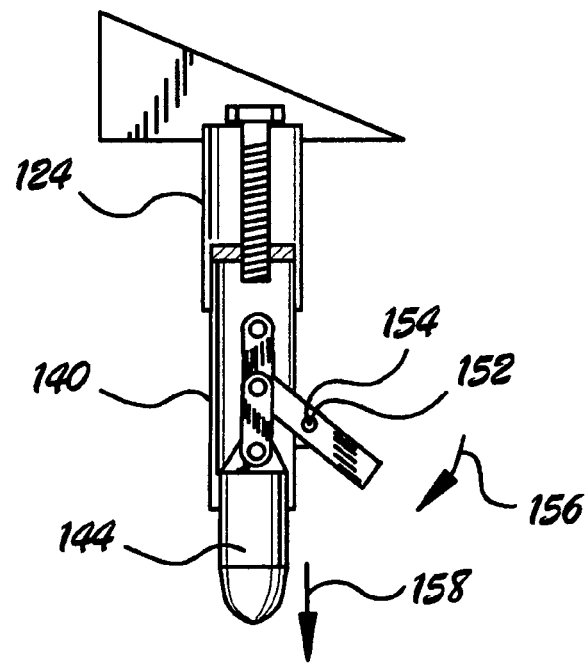
FIG. 12 is a side cross-sectional view of an upper hitch assembly mounted to a lower hitch assembly, with the lower hitch assembly extensible pin fully extended.

FIG. 11 is a side cross-sectional view of upper hitch assembly 124 mounted to lower hitch assembly 140, with lower hitch assembly extensible pin 144 fully retracted. FIG. 12 is a side cross-sectional view of upper hitch assembly 124 mounted to lower hitch assembly 140, with lower hitch assembly extensible pin 144 fully extended.

Referring now also to FIGS. 11 and 12, upper hitch assembly further comprises upper hitch assembly adjustment screw 138 rotatably attached to upper hitch assembly 124. Upper hitch assembly also comprises upper hitch assembly bore 125 sized to admit an upper portion of lower hitch assembly 140. Lower hitch assembly 140 comprises lower hitch assembly threaded bore 160 sized to mate with upper hitch assembly adjustment screw 138, whereby the axial position of upper hitch assembly 124 relative to lower hitch assembly 140 may be adjusted.

Lower hitch assembly 140 further comprises lower hitch assembly bore 141 within which lower hitch assembly extensible pin 144 reciprocates. Lower hitch assembly extensible pin actuator 146 is rotatably attached to lower hitch assembly 140. Lower hitch assembly extensible pin link 148 is rotatably attached at one end to lower hitch assembly extensible pin actuator 146, and at an opposite end is rotatably attached to lower hitch assembly extensible pin 144. Thus, moving lower hitch assembly extensible pin actuator 146 has the effect of extending and retracting lower hitch assembly extensible pin 144.

Moving lower hitch assembly extensible pin actuator 146 as indicated by arrow 156 in FIG. 12 has the effect of extending lower hitch assembly extensible pin 144 as indicated by arrow 158 in FIG. 12.

Lower hitch assembly 140 further comprises lower hitch assembly tab 150 having lower hitch assembly tab bore 152. Lower hitch assembly extensible pin actuator 146 further comprises lower hitch assembly extensible pin actuator bore 154. Lower hitch assembly tab bore 152 is located so as to co-extend with lower hitch assembly extensible pin actuator bore 154 when lower hitch assembly extensible pin 144 is extended, so a pin or lock may be installed through lower hitch assembly tab bore 152 and lower hitch assembly extensible pin actuator bore 154 so as to retain lower hitch assembly extensible pin 144 in the extended position.

Referring now to FIG. 10, lower hitch assembly 140 further comprises lower hitch assembly ears 142 sized to slide into receptacle slots 174. Receptacle 172 comprises receptacle threaded stud 178 attached to receptacle platform 175. Two receptacle slots 174 are attached to opposite edges of receptacle platform 175, and are sized to admit one lower hitch assembly ear 142 each, whereby the axial position between lower hitch assembly 140 and receptacle 172 may be fixed. As may be noted in FIG. 10, each receptacle slot 174 is larger at one end than the opposite end, to facilitate the entry of lower hitch assembly ear 142.

Receptacle 172 further comprises receptacle bore 176 sized to admit lower hitch assembly extensible pin 144. Thus, lower hitch assembly 140 is attached to receptacle 172 by sliding lower hitch assembly ears 142 into respective receptacle slots 174, and extending lower hitch assembly extensible pin 144 as described above into receptacle bore 176. A pin or lock may then be inserted through lower hitch assembly tab bore 152 and lower hitch assembly extensible pin actuator bore 154 so as to lock lower hitch assembly extensible pin 144 in the extended position, thus locking lower hitch assembly 140 into attachment with receptacle 172.

Receptacle threaded stud 178 is sized to slide into a standard truck bumper trailer hitch bore, and be fastened in place there with receptacle nut 180 sized to mate with receptacle threaded stud 178.

Thus, an entire dumping insert 2 may be quickly and easily removed from a truck upon which it was mounted by simply retracting forward brace arm extensible pins 102, retracting lower hitch assembly extensible pin 144, and sliding dumping insert 2 backwards. In smaller trucks, forward brace arms 92 may be placed in the stowed position to avoid truck bed wheel well interference. Low friction glides 78 render the sliding operation quick and virtually effortless.

Conversely, an entire dumping insert 2 may be quickly and easily installed on a truck by simply sliding dumping insert 2 forwards so the lower hitch assembly ears 142 slide into respective receptacle slots 174, extending lower hitch assembly extensible pin 144 into receptacle bore 176, and extending forward brace arm extensible pins 102 into the corner between truck bed wall 114 and truck bed wall lip 116. In smaller trucks, forward brace arms 92 may be placed in the stowed position to avoid truck bed wheel well interference while sliding dumping insert 2 into the truck. Low friction glides 78 render the sliding operation quick and virtually effortless.

In the preferred embodiment, most components of dumping insert were made of metal, plastic or other synthetic. Winch 58, pulleys 62, and cable 60 were standard, off-the-shelf items. Skirt 24 was made of stiff rubber, and was attached to the rear of dumping body 20 by means of a thinner, flexible strip of rubber, thus providing a hinge-like attachment. Slider blocks 64 and glides 78 were made of low friction material such as ultra high molecular weight ("UHMW") plastic, Teflon® low friction material, other synthetic, or any other appropriate low-friction material. Springs 52 were bungee cords, coil springs, or other appropriate resilient material.

While a preferred embodiment of the invention has been illustrated herein, it is to be understood that changes and variations may be made by those skilled in the art without departing from the spirit of the appending claims.

DRAWING ITEM INDEX

2 dumping insert
20 dumping body
22 dumping body arm
24 skirt
40 base
42 track
43 track floor
44 track outer wall
46 track outer wall slot
48 track inner wall
50 traveler
52 spring
54 forward brace
56 rear brace
58 winch
60 cable
62 pulley
64 slider block
66 traveler pin
68 hinge
70 arrow
72 arrow
74 arrow
76 arrow
78 glide
80 forward brace roof
82 forward brace roof slot
84 forward brace wall
86 forward brace wall slot
88 forward brace wall slot lobe
90 forward brace wall slot lobe détente
92 forward brace arm
94 forward brace arm roof
96 forward brace arm wall
98 forward brace arm tab
100 forward brace arm pin
102 forward brace arm extensible pin
104 forward brace arm extensible pin threaded stud
105 forward brace arm extensible pin handle
106 forward brace arm extensible pin threaded bore
108 arrow
109 arrow
110 arrow
111 arrow
112 truck bed
114 truck bed wall
116 truck bed wall lip
120 rear brace wall
122 rear brace wall threaded bore
124 upper hitch assembly
125 upper hitch assembly bore
126 upper hitch assembly fastener aperture
128 upper hitch assembly fastener
130 upper hitch assembly fastener head
132 upper hitch assembly fastener threaded stud
134 upper hitch assembly fastener aperture upper lobe
136 upper hitch assembly fastener aperture lower lobe
138 upper hitch assembly adjustment screw
140 lower hitch assembly
141 lower hitch assembly bore
142 lower hitch assembly ear
144 lower hitch assembly extensible pin
146 lower hitch assembly extensible pin actuator
148 lower hitch assembly extensible pin link
150 lower hitch assembly tab
152 lower hitch assembly tab bore
154 lower hitch assembly extensible pin actuator bore
156 arrow
158 arrow
160 lower hitch assembly threaded bore
162 downlock strap
164 downlock strap slot
166 downlock strap fastener
168 forward brace threaded bore
170 downlock strap hook
172 receptacle
174 receptacle slot
175 receptacle platform
176 receptacle bore
178 receptacle threaded stud
180 receptacle nut

We claim:

1. A dumping insert comprising a dumping body rotationally attached to a base, said base comprising a pair of tracks mutually attached by a forward brace at one end of said tracks and a rear brace at an opposite end of said tracks, a traveler extending between said tracks and reciprocating along said tracks, a winch attached to said rear brace, a pulley on said traveler, a cable attached to said winch, said cable being routed through said pulley and attached to said rear brace, at least one dumping body arm rotationally attached at one end to said dumping body and at another end to said traveler, and at least one spring urging said dumping body into a retracted position.

2. The dumping insert of claim 1 wherein each said track comprises a track outer wall rigidly attached along a track floor, a track outer wall slot disposed in each said track outer wall, and a traveler pin rigidly attached at each end of said traveler, each said traveler pin being sized to slidably fit into one said track outer wall slot, whereby said dumping body is prevented from over-extending.

3. The dumping insert of claim 2 further comprising a track inner wall rigidly attached along an edge of each said track opposite said track outer wall, and a slider block rotatably attached at opposite ends of said traveler, each said slider block being sized to slidably fit between a respective said track inner wall and said track outer wall.

4. The dumping insert of claim 1 further comprising a second pulley attached to said traveler, and a third pulley attached to said rear brace, said cable being routed through said third pulley and then said second pulley prior to being attached to said rear brace, whereby a dumping capacity of said dumping insert may be increased.

5. The dumping insert of claim 1 further comprising a skirt hingeadly attached to a rear of said dumping body, said skirt substantially extending a width of said dumping body and hanging at or below said rear brace when said dumping body is retracted, whereby access to said winch and cable is limited.

6. The dumping insert of claim 1 further comprising a forward brace arm rotatably attached at two ends of said forward brace, a forward brace arm extensible pin disposed at an end of each said forward brace arm opposite said forward brace, whereby extension of the forward brace arm extensible pins against a truck bed wall locks said forward brace in place in a truck bed.

7. The dumping insert of claim 6 wherein said forward brace comprises a forward brace roof having at least one forward brace roof slot, and at least one of said forward brace arms comprises a forward brace arm tab disposed at an end of said forward brace arm closest said forward brace, each said forward brace arm tab being sized to fit into a corresponding said forward brace roof slot, whereby said at least one forward brace arm may be retained in a stowed position when said forward brace arm tab is inserted into a corresponding said forward brace roof slot.

8. The dumping insert of claim 7 wherein each said forward brace arm further comprises a forward brace arm pin disposed at said end of said forward brace arm closest said forward brace, and a distance from each said forward brace arm pin to an associated forward brace arm tab is substantially equal to a distance from said at least one forward brace roof slot to an associated centermost forward brace wall slot lobe détente.

9. The dumping insert of claim 6 wherein each said forward brace arm further comprises a forward brace arm pin disposed at an end of said forward brace arm closest said forward brace, and said forward brace further comprises a forward brace wall rigidly attached along one edge of a forward brace roof, another forward brace wall rigidly attached along an opposite edge of said forward brace roof, a forward brace wall slot disposed at two ends of each said forward brace wall, each forward brace wall slot comprising a plurality of forward brace wall slot lobes extending from, and communicating with, an associated said forward brace wall slot, each forward brace wall slot lobe terminating in a forward brace wall slot lobe détente extending from, and communicating with, its associated forward brace wall slot lobe, each forward brace wall slot lobe détente extending away from its associated forward brace wall slot lobe towards a center of said forward brace, each said forward brace wall slot, forward brace wall slot lobe, and forward brace wall slot lobe détente being sized to admit said forward brace arm pin.

10. The dumping insert of claim 9 wherein each said forward brace arm comprises a forward brace arm wall rigidly attached along one edge of a forward brace arm roof, and another forward brace arm wall rigidly attached along an opposite edge of said forward brace arm roof, said forward brace arms being spaced apart so as to permit said forward brace to nest within each said forward brace arm, said forward brace arm pin extending between the respective forward brace arm walls.

11. The dumping insert of claim 10 wherein said forward brace arm is rotatably attached to said forward brace by means of said forward brace arm pin passing through at least one said forward brace wall slot, forward brace wall slot lobe, or forward brace wall slot lobe détente.

12. The dumping insert of claim 6 wherein said forward brace arm extensible pin comprises a forward brace arm extensible pin threaded stud and a mating forward brace arm extensible pin threaded bore, whereby rotation of said forward brace arm extensible pin threaded stud relative to said mating forward brace arm extensible pin threaded bore adjusts a length of said forward brace arm extensible pin.

13. The dumping insert of claim 12 wherein said forward brace arm extensible pin is an over-center toggle type extensible pin.

14. The dumping insert of claim 1 further comprising a downlock strap removably attached to said base, said downlock strap comprising a downlock strap hook disposed at an end of said downlock strap opposite said base, said downlock strap hook being sized to engage with said dumping body.

15. The dumping insert of claim 14 wherein said downlock strap is attached to said forward brace by means of a downlock strap fastener tightened through a downlock strap slot into a forward brace threaded bore, whereby a distance between said downlock strap hook and said forward brace may be adjusted.

16. The dumping insert of claim 1 further comprising an upper hitch assembly, means for removably attaching said upper hitch assembly to said base, a lower hitch assembly attached to said upper hitch assembly, a receptacle, and means for removably attaching said lower hitch assembly to said receptacle.

17. The dumping insert of claim 16 wherein said means for removably attaching said lower hitch assembly to said receptacle comprises a receptacle bore in said receptacle, and a lower hitch assembly extensible pin in said lower hitch assembly.

18. The dumping insert of claim 17 wherein said means for removably attaching said lower hitch assembly to said receptacle further comprises at least one lower hitch assembly ear on said lower hitch assembly, a receptacle platform, and at least one receptacle slot disposed along an edge of said receptacle platform sized to admit said at least one ear.

19. The dumping insert of claim 18 wherein said means for removably attaching said lower hitch assembly to said receptacle comprises two lower hitch assembly ears on opposite sides of said lower hitch assembly, and said receptacle comprises two receptacle slots disposed along opposite edges of said platform, each said receptacle slot being larger at one end than the opposite end, whereby the entry of said lower hitch assembly ears may be facilitated.

20. The dumping insert of claim 18 wherein said lower hitch assembly further comprises a lower hitch assembly bore, said lower hitch assembly extensible pin being sized to reciprocate within said lower hitch assembly bore, a lower hitch assembly extensible pin actuator rotatably attached to said lower hitch assembly, a lower hitch assembly extensible pin link rotatably attached at one end to said lower hitch assembly extensible pin actuator and at an opposite end to said lower hitch assembly extensible pin, whereby movement of said lower hitch assembly extensible pin actuator causes said lower hitch assembly extensible pin to extend and retract.

21. The dumping insert of claim 20 wherein said lower hitch assembly further comprises a lower hitch assembly tab having a lower hitch assembly tab bore, and said lower hitch assembly extensible pin actuator further comprises a lower hitch assembly extensible pin actuator bore, said lower hitch assembly tab bore being located so as to co-extend with said lower hitch assembly extensible pin actuator bore when lower hitch assembly extensible pin is extended, whereby a pin or lock may be installed through said lower hitch assembly tab bore and said lower hitch assembly extensible pin actuator bore, thereby locking said lower hitch assembly extensible pin in an extended position.

22. The dumping insert of claim 16 wherein said receptacle further comprises a receptacle threaded stud sized to fit into a bumper hitch bore, and means of attaching said receptacle to a bumper.

23. The dumping insert of claim 22 wherein said means of attaching said receptacle to a bumper comprises a receptacle nut sized to mate with said receptacle threaded stud.

24. The dumping insert of claim 16 wherein said means for removably attaching said upper hitch assembly to said base comprises at least one upper hitch assembly fastener aperture in said upper hitch assembly, a rear brace wall attached to said rear brace, a rear brace wall threaded bore in said rear brace wall corresponding to each said upper hitch assembly fastener aperture, and an upper hitch assembly fastener sized to mate with said rear brace wall threaded bore corresponding to each said at least one upper hitch assembly fastener aperture.

25. The dumping insert of claim 24 wherein said upper hitch assembly fastener comprises an upper hitch assembly fastener threaded stud attached to an upper hitch assembly fastener head, and each said upper hitch assembly fastener aperture comprises an upper hitch assembly fastener aperture upper lobe communicating with an upper hitch assembly fastener aperture lower lobe, said upper hitch assembly fastener aperture lower lobe being sized to admit said upper hitch assembly fastener head, said upper hitch assembly fastener aperture upper lobe being sized to admit said upper hitch assembly fastener threaded stud but not said upper hitch assembly fastener head.

26. The dumping insert of claim 24 wherein said upper hitch assembly further comprises an upper hitch assembly bore sized to slidably admit an upper portion of said lower hitch assembly, an upper hitch assembly adjustment screw in rotatable engagement with said upper hitch assembly, and said lower hitch assembly further comprises a lower hitch assembly threaded bore sized to mate with said upper hitch assembly adjustment screw, whereby rotation of said upper hitch assembly adjustment screw adjusts a position of said upper hitch assembly relative to said lower hitch assembly.

27. The dumping insert of claim 1 wherein said at least one spring is attached at one end to said traveler and at another end to said forward brace, and said dumping body is rotatably attached to said base with at least one hinge.

28. The dumping insert of claim 1 further comprising a low-friction glide attached to each said track, whereby said dumping insert may be quickly and effortlessly slid in and out of a truck bed.

* * * * *